(12) United States Patent
Soma et al.

(10) Patent No.: US 8,360,380 B2
(45) Date of Patent: Jan. 29, 2013

(54) CUP HOLDER WITH FLEXIBLE PROTRUDING PORTION

(75) Inventors: Toshiaki Soma, Utsunomiya (JP); Tsuyoshi Fukuda, Sagamihara (JP)

(73) Assignee: Nifco Inc., Yokohama-shi (JP)

( * ) Notice: Subject to any disclaimer, the term of this patent is extended or adjusted under 35 U.S.C. 154(b) by 0 days.

(21) Appl. No.: 12/736,062

(22) PCT Filed: Mar. 6, 2009

(86) PCT No.: PCT/JP2009/001029
§ 371 (c)(1),
(2), (4) Date: Sep. 24, 2010

(87) PCT Pub. No.: WO2009/110248
PCT Pub. Date: Sep. 11, 2009

(65) Prior Publication Data
US 2011/0006092 A1    Jan. 13, 2011

(30) Foreign Application Priority Data

Mar. 7, 2008  (JP) ................................. 2008-057901

(51) Int. Cl.
*A47K 1/08*    (2006.01)
(52) U.S. Cl. ...................... 248/311.2; 224/926; 248/314
(58) Field of Classification Search ............... 248/311.2, 248/312, 312.1, 309.1, 314, 316.3, 313; 224/542, 224/282, 926, 552; 296/37.15
See application file for complete search history.

(56) References Cited

U.S. PATENT DOCUMENTS

| | | | |
|---|---|---|---|
| 4,655,425 A | | 4/1987 | Wallance et al. |
| 4,928,873 A | * | 5/1990 | Johnson .................... 220/738 |
| 5,054,733 A | | 10/1991 | Shields |
| 5,404,800 A | * | 4/1995 | Hsu ................... 99/426 |
| 5,520,313 A | * | 5/1996 | Toshihide ................ 224/539 |
| 5,718,405 A | * | 2/1998 | Adachi .................. 248/311.2 |
| 5,839,711 A | * | 11/1998 | Bieck et al. ................ 248/313 |
| 6,050,468 A | * | 4/2000 | Kelley ..................... 224/542 |
| 6,641,102 B2 | * | 11/2003 | Veltri et al. ............. 248/311.2 |
| 6,715,727 B2 | * | 4/2004 | Sambonmatsu .......... 248/311.2 |
| 7,147,192 B2 | * | 12/2006 | Kong ..................... 248/311.2 |
| 7,165,752 B2 | * | 1/2007 | Dobos .................... 248/311.2 |
| 7,226,029 B2 | * | 6/2007 | Hoshi .................... 248/311.2 |
| 7,413,154 B2 | * | 8/2008 | Harshman et al. ......... 248/311.2 |
| 7,481,343 B2 | * | 1/2009 | Misumi .................... 224/282 |

(Continued)

FOREIGN PATENT DOCUMENTS

DE   10 2005 044 358 A1   4/2006
EP         0 800 954        2/1997

(Continued)

*Primary Examiner* — Nkeisha Smith
(74) *Attorney, Agent, or Firm* — Manabu Kanesaka

(57) ABSTRACT

A cup holder for holding and retaining a cup includes a container integrally formed of a resin material as one structure with flexibility. The container includes a bottom portion, a cup retaining portion defined as a sidewall upstanding from the bottom portion, and at least one flexible protruding portion formed in the sidewall where the bottom portion does not contact. The flexible protruding portion is thinner in thickness than other portion of the side wall and protrudes towards an inside direction of the cup retaining portion. A rib is formed on an outside surface of the container to extend from the other portion of the side wall formed thicker than the protruding portion to a center of the protruding portion. An urging device is formed for pressing the protruding portion towards an inside of the container.

7 Claims, 7 Drawing Sheets

U.S. PATENT DOCUMENTS

| | | | |
|---|---|---|---|
| 7,611,115 B2* | 11/2009 | Kniazyszcze et al. | 248/311.2 |
| 7,866,620 B2* | 1/2011 | Kaemmer | 248/311.2 |
| 2003/0071047 A1* | 4/2003 | Harada | 220/835 |
| 2004/0016858 A1* | 1/2004 | Bong | 248/311.2 |
| 2004/0021048 A1* | 2/2004 | Schaal | 248/310 |
| 2005/0279752 A1 | 12/2005 | Harada | |
| 2006/0027722 A1* | 2/2006 | Hoshi | 248/311.2 |
| 2006/0118688 A1* | 6/2006 | Kong | 248/311.2 |
| 2007/0221804 A1* | 9/2007 | Harshman et al. | 248/311.2 |

FOREIGN PATENT DOCUMENTS

| | | |
|---|---|---|
| FR | 2 899 872 | 10/2007 |
| JP | H02-60034 U | 5/1990 |
| JP | H10-044855 | 2/1998 |
| JP | H11-348641 | 12/1999 |

* cited by examiner

CUP HOLDER WITH FLEXIBLE PROTRUDING PORTION

TECHNICAL FIELD

This invention relates to a cup holder, more specifically, an automotive cup holder that could stably retain a drink container of various sizes and shapes.

BACKGROUND ART

Conventionally, a console box of a car has a cup holder that could retain a drink container. There is a cup holder that has a cylindrical concave portion with a bottom, in which the concave portion is used to retain the drink container (cup). However, a drink container has various sizes and shapes, so a cup holder that could stably retain these drink containers in various sizes and shapes is needed.

Through this viewpoint, there is a cup holder having a cylindrical concave portion with a bottom disposed integrally using flexible material and providing the sidewall of the concave portion with multiple protruding portions. (For example, Patent Document 1). The cup holder described in Patent Document 1 is fit for various shapes of drink containers because the drink container is retained between flexible multiple protruding portions.

Patent Document 1: U.S. Pat. No. 6,050,468

SUMMARY OF INVENTION

The Object of this Invention

However, when a cup holder is integrally formed by using a flexible material as described in Patent Document 1, because of a molding problem, the thickness of the protruding portion requires to be formed relatively thick. When integrally molding goods using flexible material, injection molding is used; but, defects such as filling defects and generation of air foam occurs more frequently if the wall thickness is thin using injection molding. When the wall thickness of the protruding portion is thick, the increase in the stiffness of the protruding portion makes the deformation more difficult, which will increase the friction between the drink container and the protruding portion; thus, a problem such as the deterioration of the usability and the handling occurs.

Also, the cup holder described in Patent Document 1 has a protruding portion extending from the sidewall to the bottom portion making the drink container to reach the bottom portion more difficult. Also, even if the drink container reaches the bottom portion, the bottom portion will lose its flatness due to the deformation of the protruding portion. Thus, upstanding the drink container in a vertical position is difficult.

In view of the foregoing, the object of this invention is to provide a drink container with increased usability and handling ability, the increased stability of vertically upstanding the drink container, and an easier manufacturing of the cup holder.

The Method to Solve the Problem

In order to solve the above-described problem, the first aspect of this invention is a cup holder (1), which stores and retains a cup, and comprises a container (4) with a cup retaining portion (3) defined by a bottom portion (41) and a sidewall (42) upstanding from the bottom portion (41), wherein a section of the sidewall, where the bottom portion does not contact, forms at least one flexible protruding portion (46) protruding towards the inside direction of the cup retaining portion.

Because the cup holder holds the cup using the protruding portion formed on the sidewall of the cup retaining portion, the cup is retained stably. The protruding portion is flexible; therefore, it can deform to fit a cup with various shapes. Also, the protruding portion is positioned separately from the bottom portion, therefore, the protruding portion could deform without being involved in the deformation of the bottom portion. Thus, the shape of the bottom portion is maintained to up-stand the cap stably.

The second aspect of this invention is the container in the first embodiment wherein the container is formed integrally from a flexible resin material.

In this structure, the protruding portion and the whole container could be integrated by disposing with the same flexible material. Also, during the deformation of the protruding portion, the surrounding sidewall deforms so the protruding portion can further flexibly deform.

The third aspect of this invention resides, in the first aspect, in that the portion forming the protruding portion is formed thinner in thickness compared to the wall thickness of other portions of the sidewall.

In this structure, because the protruding portion is formed thinly compared to the other portions of the container, the flexibility is increased allowing easier deformation, which improves the fitness of the container. Also, because the holding force of the container decreases by the protruding portion, retaining and releasing of the container is easier so the handling or the usability also improves.

The fourth aspect of this invention resides, in the third aspect, in that, in an outside surface of the sidewall, a rib (5) is formed to extend from a section formed thicker compared to the section of the sidewall forming the protruding portion, to the center of the protruding portion.

In this structure, when the container is formed by injection molding, a resin material equally spreads the thin portion by using the rib, so the molding becomes easier and the manufacturing yield improves.

The fifth aspect of this invention resides, in the fourth aspects, in that the rib extends parallel to the inserting direction of the cup to the cup retaining portion.

In this structure, the deforming direction of the protruding portion is defined by the position of the rib, so when retaining the cup, the protruding portion deforms smoothly, which improves the handling when retaining the cup.

The sixth aspect of this invention resides, in the fourth or fifth aspect, in that the rib crosses and extends the protruding portion.

In this structure, when forming the container by injection molding, the resin material flows smoothly to the thin portion, so the molding becomes easier.

The seventh embodiment of this invention resides, in any one of the first to the sixth aspects, in that urging means for urging the protruding portion towards the inside is provided.

In this structure, the protruding portion is urged continuously towards the side of the cup, so the cup is held certainly; thus, the retaining stability of the cup improves. Also, in the condition even after taking out the cup, the protruding portion remains protruding towards the inner side of the receiving portion, so the function retaining the next cup can be obtained.

The eighth aspect of this invention resides, in any one of the first to seventh aspects, in that the container has a frame member for supporting the container, and the container is formed from material with higher friction coefficient than the frame member.

By forming the container separately from the frame members, the selection of materials expands. Therefore, the container that forms the cup retaining portion is formed with materials with high friction coefficient, so the retention stability of the cup improves.

Effect of the Invention

The invention provides a cup holder that could stably retain a cup with various forms in an upstanding vertical condition. The cup holder has less resistance during insertion and taking-out of the cup, and the usability and the handling is better. Also, the cup holder is easy to mold.

DETAILED DESCRIPTION OF PREFERRED EMBODIMENTS

A cup holder, which is the first embodiment of the present invention, will be explained with reference to the drawings.

Figure 1:
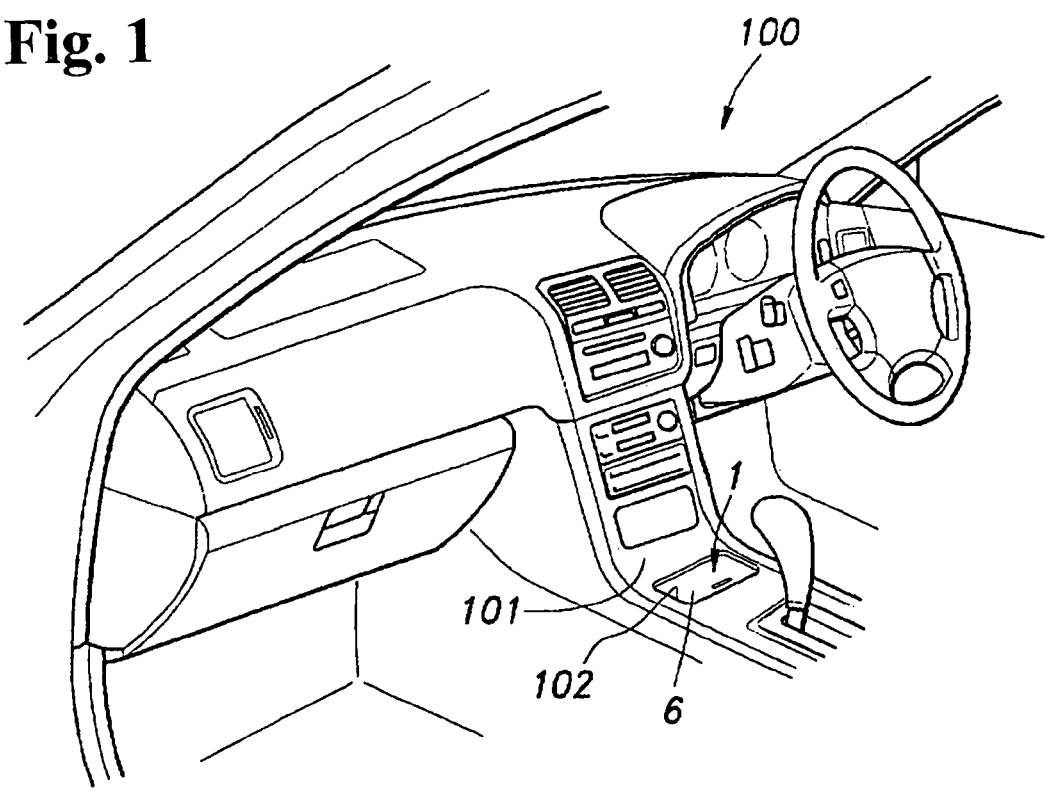
FIG. 1 is a perspective view of a cup holder attached to a vehicle according to this embodiment.
Figure 2:
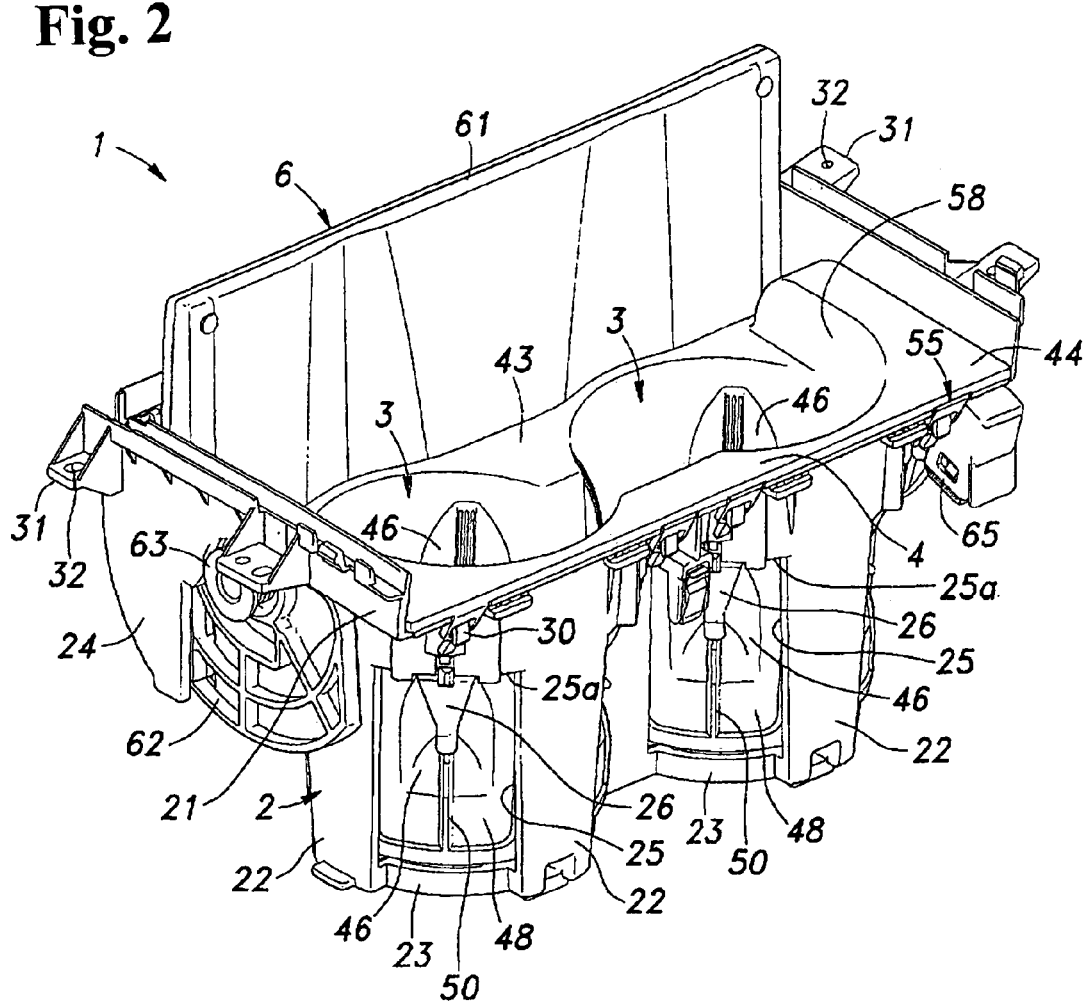
FIG. 2 is a perspective view of the cup holder according to this embodiment.
Figure 3:
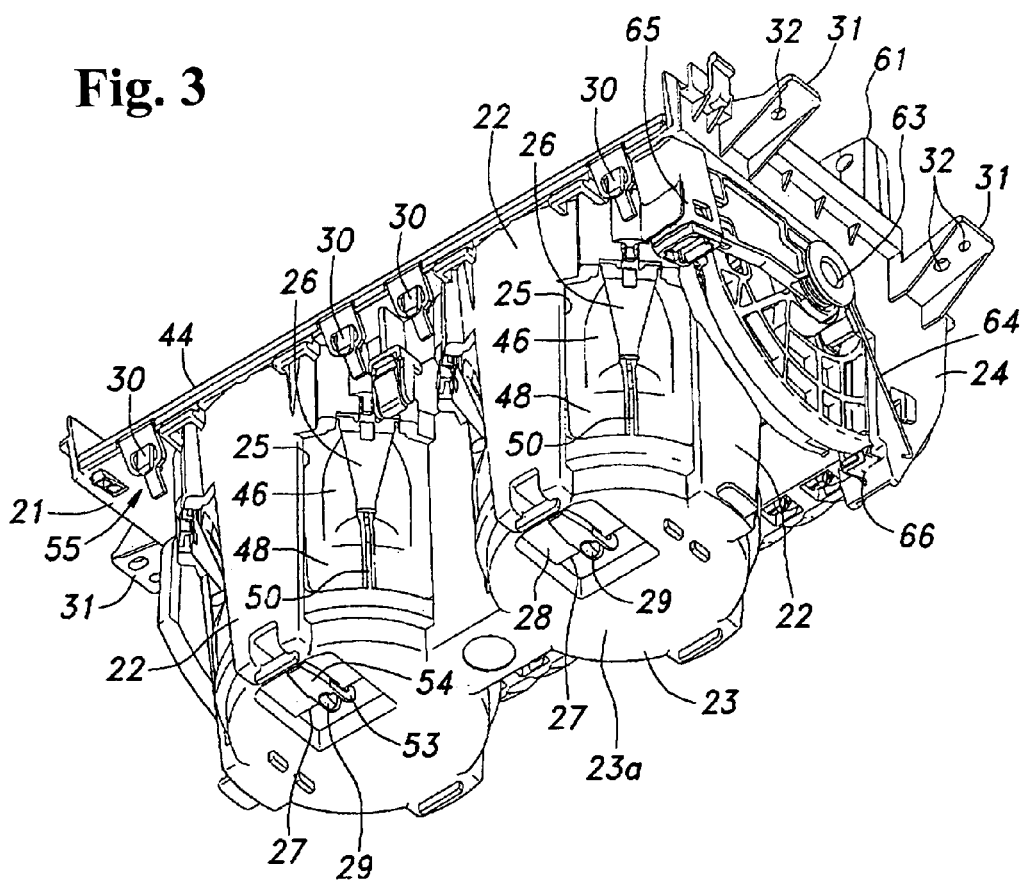
FIG. 3 is a perspective view of the cup holder according to this embodiment.
Figure 4:
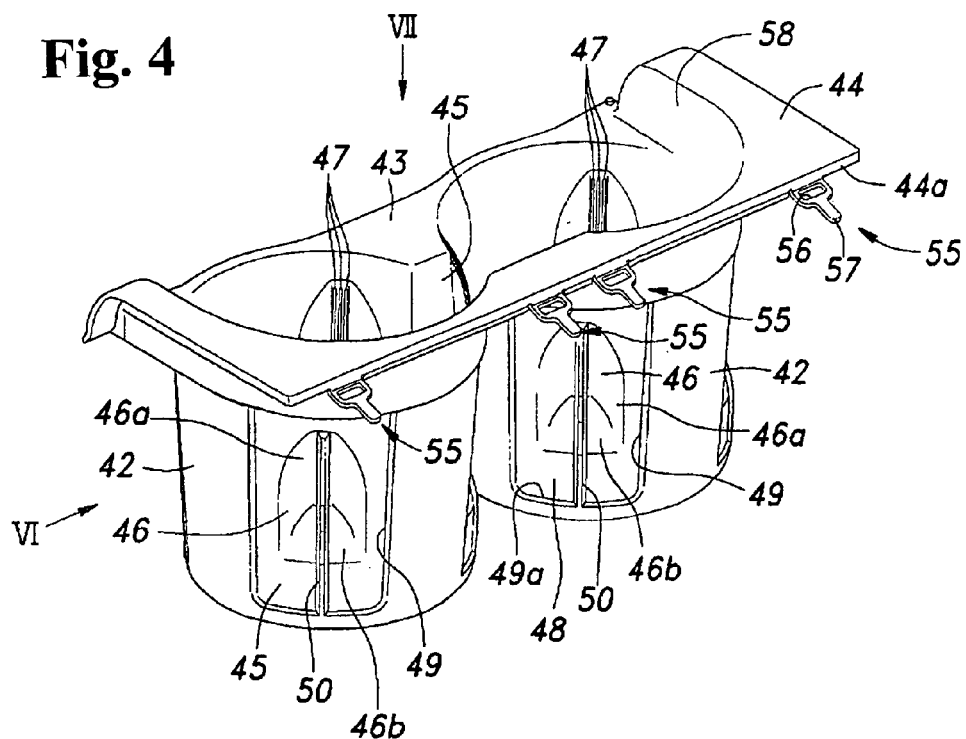
FIG. 4 is a perspective view of a container of the cup holder according to this embodiment.
Figure 5:
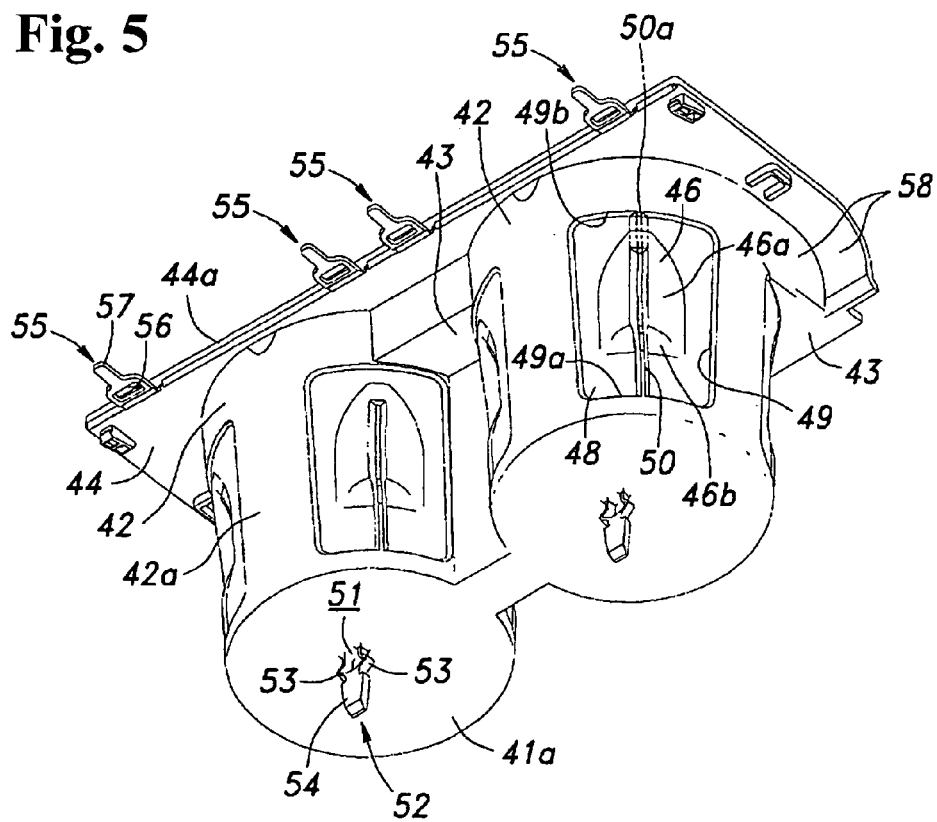
FIG. 5 is a perspective view of the container of the cup holder according to this embodiment.
Figure 6:
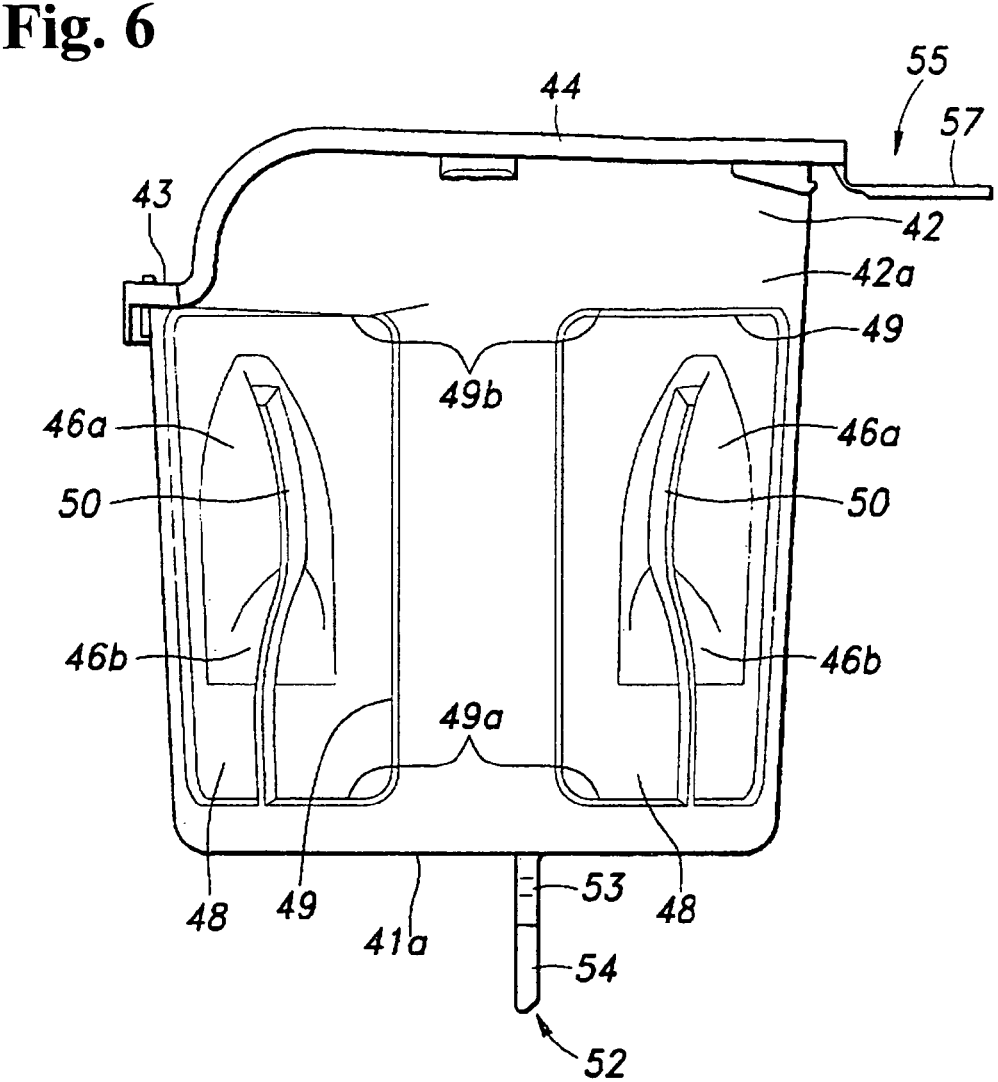
FIG. 6 is a side view of the container viewed from the arrow VI of FIG. 4 according to this embodiment.
Figure 7:
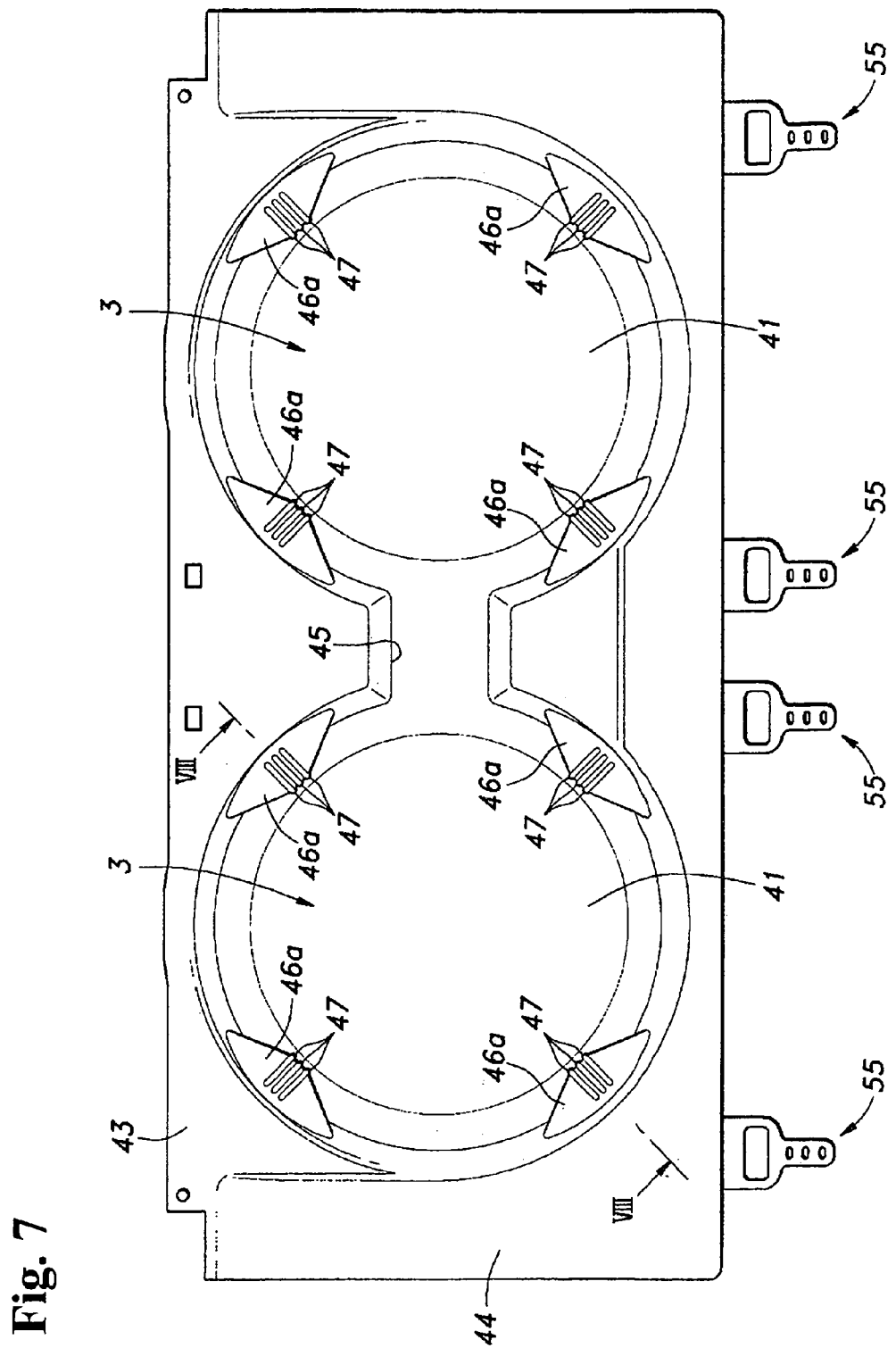
FIG. 7 is a plan view of the container viewed from the arrow VII of FIG. 4 according to this embodiment.
Figure 8:
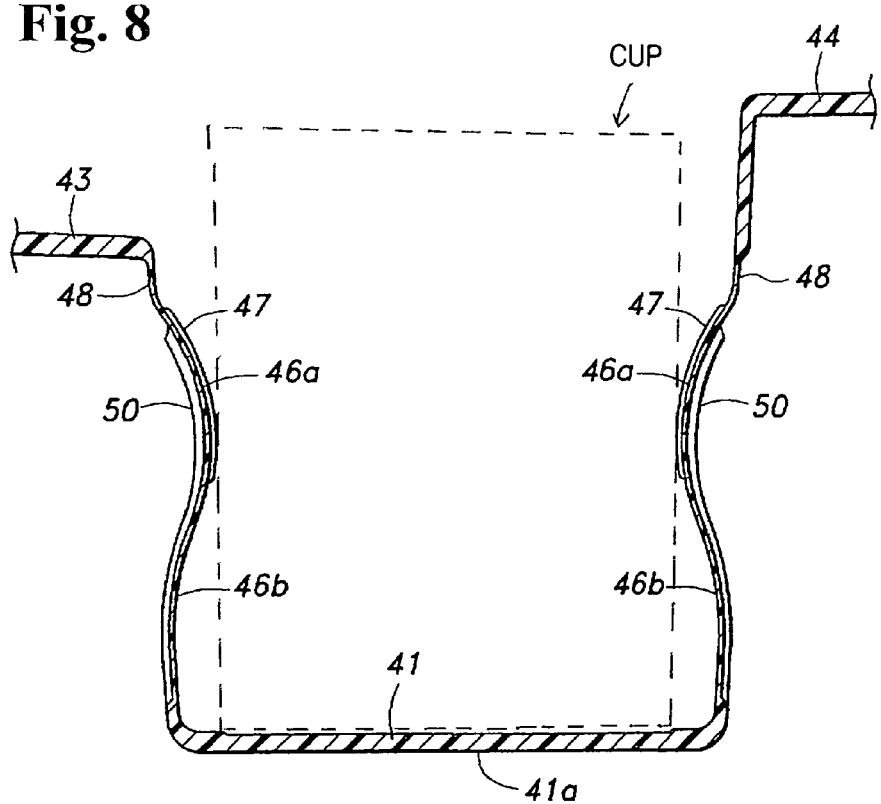
FIG. 8 is a cross-sectional view of the container viewed along the arrow VIII of FIG. 7 according to this. embodiment.

FIG. 1 is a perspective view of a cup holder attached to the vehicle according to this embodiment. FIG. 2 is a perspective view of the cup holder according to this embodiment. FIG. 3 is a perspective view of the cup holder according to this embodiment. FIG. 4 is a perspective view of a container of the cup holder according to this embodiment. FIG. 5 is a perspective view of the container of the cup holder according to this embodiment. FIG. 6 is a side view of the container viewed from the arrow VI of FIG. 4 according to this embodiment. FIG. 7 is a plan view of the container viewed from the arrow VII of FIG. 4 according to this embodiment. FIG. 8 is a cross-sectional view of the container viewed along the arrow VIII of FIG. 7 according to this embodiment. For convenience of explaining, the upper side of the paper is the upper side of the cup holder in FIG. 2, FIG. 3, FIG. 4, FIG. 5, FIG. 6, and FIG. 8.

As shown in FIG. 1, according to this embodiment, the cup holder 1 is attached to the console box 101 located between the driver's seat and the passenger's seat of the car 100. The console box 101 includes an opening 102, and the cup holder 1 is attached by matching the upper portion of the cup holder with the fringe of the opening 102, from the lower portion of the console box 101.

As shown in FIG. 2 and FIG. 3, the main components of the cup holder 1 is comprised of a frame member 2; a container 4 comprising a cup retaining portion 3, which has an opening at the upper portion and is supported by the frame member 2; and a lid portion 6, which can open and close the cup retaining portion 3, and is pivotally attached to the frame member 2. The cup holder 1 is attached by facing the opening side of the cup retaining portion 3 towards the upper portion and matching the opening 102, from the lower portion of the console box 101.

The frame member 2 and a lid portion 6 are formed by the injection molding of such as ABS resin, polycarbonate resin, ABS/polycarbonate alloy. The container 4 is a member having flexibility, and is formed by the injection molding of a thermoplastic resin material. The resin materials used are such as thermoplastic elastomer, and olefin type thermoplastic elastomer is especially favorable.

In FIG. 4 to FIG. 8, drawings wherein the container 4 is separated from the holder 1 are shown. As shown in FIG. 4 to FIG. 8, the container 4 comprises two cylindrical cup receiving sections 3, each comprising a bottom portion 41 and a cylindrical sidewall 42. A part of upper portions of the two cup retaining portions 3 are connected by a first flange portion 43 and the other parts are connected by a second flange 44 formed at a height different from the first flange portion 43. The first flange portion 43 and the second flange portion 44 are connected by a wall portion 58, which is substantially vertical to the two flange portions. Also, the two cup retaining portions 3 are connected by a connecting path 45.

On each sidewall 42 where the bottom portion 41 does not contact, four protruding portions 46 are formed to bulge from the sidewall 42 toward the inner direction of the cup retaining portion 3. The protruding portions 46 are positioned on a circumferential direction of the sidewall 42 at 90° spaced from each other. The protruding portion 46 comprises an upper portion 46a with an arrow shaped tip facing upwards and a lower portion 46b of an approximately semicircular portion, which matches the lower end portion of the arrow shaped portion of the upper portion 46a. As shown in FIG. 8, the upper portion 46a of the protruding portion 46 is formed to have a convex curved surface projecting towards the inside of the cup retaining portion 3, and the lower portion 46b is formed to have a convex curved surface projecting outside of the cup retaining portion 3.

On the inside surface of the upper portion 46a of the protruding portion 46 (the side facing the inside direction of the cup retaining portion 3) and the most protruding section protruding towards the inside of the cup retaining portion 3, three ribs 47 are extended in a vertical direction.

On the side surface 42a of the sidewall 42 (the side opposite to a side facing the cup retaining portion 3), a thin section 48 is formed to include the respective protruding portion 46 and the fringe. The step portion is formed on a boundary between the thin section 48 and the other parts of the sidewall 42. In this way, the thickness at the protruding portion 46 and the fringe are thinner compared to the other sections of the sidewall 42. For example, if the thickness of the other sections of the sidewall 42 is formed at approximately 1.7 mm, the thin section 48 or the protruding portion 46 and the fringe portion is formed at a thickness of approximately 0.7 mm.

A rib 50 extends from the middle section of the step portion 49a formed on the lower end portion of the thin section upwards passing the middle of the protruding portion 46. The thickness towards the radial direction of the cup retaining portion 3 at the rib 50 is formed, for example, by adding the thickness of the thin section 48 to have a thickness equal to the other sections of the sidewall 42. For example, the thickness of the other sections of the sidewall 42 is 1.7 mm, and if the thickness of the thin section 48 is 0.7 mm, the thickness of the rib 50 is formed at 1.0 mm (referring FIG. 8). The rib 50 is formed on each thin section 48. In the other embodiments, like a rib 50a shown as an imaginary line in FIG. 5, the tip of the rib 50a could be connected to the step portion 49b formed on the upper portion of the thin section 48. In other words, the rib 50a could be extended to cross the protruding portion 46 and the thin section 48.

On approximately the center portion of an outside surface 41a of the each bottom portion 41, a locking piece 52 equipped with a locking hole 51 is formed. A locking hole 51 is formed by the outside surface 41a of the bottom portion 41, two leg portions 53 protruding from the outside surface 41a of the bottom portion 41 with a predetermined space apart from each other, and a plate shaped knob portion 54 joined to the tip of the two leg portions 53. The leg portion 53 is formed in a belt or a curved shape, which has elasticity.

At the side edge 44a of the second flange portion 44, four second locking piece 55 are projecting. The end portion of the second locking piece 55 is formed wider compared to the tip portion, and the second locking hole 56 is formed on the portion formed wider. The tip portion of the second locking hole 56 is formed with a knob portion 57.

As shown in FIG. 2 and FIG. 3, a frame structure 2 comprises an upper portion structure 21 formed along the bottom side (side facing the opposite side of the cup retaining portion 3) of the second flange portion 44 and the first flange portion 43 of the container 4; a plurality of leg portions 22 extending along from the upper portion structure 21 to the outside surface of the sidewall 42 of the container 4; a lower portion structure 23 positioned on the outside surface 41a along the bottom-portion 41 of the container 4 and fixed to the tip of the leg portion 22; and a box shaped lid storing portion 24 for storing a part of the lid member 6 when the lid member 6 is in an open state.

The leg portion 22 includes an opening portion 25 at a position corresponding to a back surface of the protruding portion 46 of the container 4. In the upper end portion 25a of the opening portion 25, an end of a leaf spring 26 protruding to the middle of the opening portion 25 and to the side of the container 4 is fixed. The rib 50 is in contact with the tip portion 26 of the leaf spring 26, and the rib 50 and the backside of the protruding portion 46 are biased to the cup retaining portion 3 side.

The lower portion structure 23 includes an opening portion 27 in a position corresponding to the locking piece 52 of the container 4. Around the opening portion 27, a recessed concave portion 28 dented from the bottom surface 23a of the lower portion structure 23 is formed. In a concaved portion 28, an L-shaped locking piece 29 is formed, which extends in a parallel direction to the bottom surface 23a of the lower portion structure 23 after protruding to the lower direction. The protruding amount from the concave portion 28 of the L-shaped locking piece 29 is set not to reach the bottom surface 23a of the lower portion structure 23. The locking piece 52 of the container 4 is bent approximately 90° after passing the opening portion 27 and engages the L-shaped locking piece 29 at the locking hole 51. At this moment, the knob portion 54 of the locking portion 52 is fixed to a position by the L-shaped locking piece 29 and arranged along the surface of the concave portion 28.

The upper portion structure 21 includes a protrusion 30, which is positioned corresponding to the position formed at the second locking piece 55 of the container 4. The protrusion 30 engages the locking hole of the second locking piece 55 to prevent the second flange 44 of the container 4 from separating from the upper portion structure 21 and turning over. Also, on the side edge portion of the upper portion structure 21, a flange 31 is provided to abut against the bottom surface of the console box 101. The flange portion 31 is provided with an attachment hole 32 where a screw or a clip etc. is inserted to fix to the bottom surface of the console box 101.

The lid portion 6 comprises a plate-shaped lid body 61 and arms 62, which project approximately perpendicular to the lid body 61 on both sides of the lid body 61, and is supported pivotally at the upper portion structure 21 of the frame structure 2 by an axis 63 fixed to the arm 62. In the closed condition of the cup holder 1, the lid body 61 of the lid portion 6 covers the cup retaining portion 3 extending approximately in a horizontal direction, and from that condition until the movement is restricted by the contact with the first flange portion 43 of the container 4, pivots at the axis 63 as the center. When the lid body 61 is in contact with the first flange portion 43, the lid body 61 is in an open condition upstanding almost parallel to the pivot line of the cup retaining portion 3 (refer to FIG. 2). Because lid portion 6 stops its movement when contacting the first flange having flexibility, the hitting sound generated from the stop can be decreased. The lid body 61 is biased consistently towards the opening direction because of the torsion spring 64 provided in the axis 63. Also, the arm 62 has a push-push type latch 65, and when the lid portion 6 is in a closed condition, the section of the lid storage 24 corresponding to the push-push latch 65 has a striker 66 engaging the push-push type latch 65. Also, not shown in the figure, a rack is formed on either one of the frame structure 2 or the arm 62, and the other one has a rotating damper engaging the rack to buffer the opening-closing movement of the lid portion 6.

Next, the function and effect of this embodiment are explained. In this cup holder of the embodiment, a cup (drink container) is retained and held in the cup retaining portion 3 of the container 4. When a cup with a diameter smaller than the diameter of a sidewall 42 is held in the cup retaining portion 3, the protruding portion 46 formed on the sidewall 42 is in contact with the cup, and the cup is held stably. Since the protruding portion 46 has flexibility, the protruding portion could deform according to the size and shape of the cup, so that cups of various forms could be retained. Also, the container 4 is formed from a material with higher friction coefficient compared to the frame structure, so that the cup could be retained stably without slipping. Also, because a container 4 is formed to have a sidewall 42 and bottom portion 41 continuously, even if a liquid from the cup spills, the liquid will not spill to the lower direction, which will prevent other automotive components from rusting.

Because the protruding portion 46 is formed at the thin section 48, it could deform easily with relatively weak strength. Thus, when the cup is moved in and out from the cup retaining portion 3, the friction coefficient between the cup and the protruding portion could be decreased, and the handling and usability of the cup holder 1 would be improved. The thin section 48 extends to the protruding portion 48 to surround the protruding portion 46, so the deformation of the protruding portion 46 by holding the cup occurs extensively including a portion surrounding the protruding portion 46. Thus, the protruding portion 46 could deform easily. Because the area of the deformation is expanded, it could prevent the deformation from concentrating in one section and prevent the fatigue fracture from the deformation of the container 4.

Since the protruding portion 46 is pressed by the leaf spring 26 from the back surface side towards the inside direction of the cup retaining portion 3, the protruding portion 46 creates a predetermined amount of pressure against the cup retain the cup stably. Also, because of the leaf spring 26, the protruding portion 46 could maintain the condition of protruding towards the inside direction of the cup retaining portion 3 when the cup is not stored. Because the leaf spring 26 is in contact with the rib 50, where the thickness of the protruding portion 46 is thick, wearing of the protruding portion 46 by the contact and tearing can be prevented.

The upper portion 46a of the protruding portion 46 shows an arrow shaped tip facing upwards, so that the upper portion 46a acts as a guide when inserting the cup into the cup retaining portion 3, which leads the cup to the center position of the cup retaining portion 3. Because the rib 47 is formed in the section of the protruding portion 46 where the cup comes in contact, the contact area between the protruding portion 46 and the cup is decreased; thus, the frictional resistance by the insertion and withdrawal of the cup is decreased. Also, because the rib 47 contacts, the wearing from the friction of the protruding portion 46 can be prevented.

Because the protruding portion 46 is provided at a section separate from the bottom portion 41 of the sidewall 42, the deformation of the protruding portion 46 has no effect on the form of the bottom portion 41; thus, the bottom portion 41 is always maintained flat. Thus, the cup in the stored condition maintains an upstanding position against the bottom portion 41. If the bottom portion 41 is positioned horizontally, the cup maintains a vertically upstanding position.

By providing the rib 50 on the thin section 48, the manufacturing of the container 4 becomes easier. When forming the container 4 by injection molding, because of the thinness of the thin section 48, the problem such as a filling defect of the resin may occur, but the rib 50 ensures a flow path of the resin and the resin is equally filled to the center of the thin section 48; thus, the manufacturing yield improves. If the rib 50 is extended to cross the thin section 48, the filling of the resin to the thin section 48 becomes even easier, which prevents the occurrence of defective products.

The explanation of the embodiment is done, but this invention is not restricted to the above-mentioned embodiment and is able to be applied extensively. The protruding portion 46 could be formed in various forms; for example, it could be formed in a ring form extending towards the circumferential direction of the sidewall 42. Also, the number of protruding portion 46 and rib 50 could be adjusted accordingly. Without deviating from the effect of the invention, the rest of the structure of the control unit could be adjusted accordingly.

EXPLANATION OF THE REFERENCE SYMBOLS 1 cup holder
2 frame structure
3 cup retaining portion
4 container
6 lid body
41 bottom portion
42 sidewall
43 first flange portion
44 second flange portion
46 protruding portion
47 rib
48 thin section
49 step portion
50 rib

What is claimed is:

1. A cup holder holding and retaining a cup comprising:
a container integrally formed of a resin material as one structure with flexibility, and having a bottom portion; a cup retaining portion defined as a sidewall upstanding from the bottom portion; at least one flexible protruding portion formed in the sidewall where the bottom portion does not contact, the flexible protruding portion being thinner in thickness than other portion of the sidewall and protruding towards an inside direction of the cup retaining portion; and a rib formed on an outside surface of the container and extending from the other portion of the sidewall formed thicker than the protruding portion to a center of the protruding portion, and
an urging device for pressing the protruding portion towards an inside of the container from outside the container.

2. A cup holder according to claim 1, wherein the rib extends parallel to an inserting direction of the cup to the cup retaining portion.

3. A cup holder according to claim 1, wherein the rib extends across the protruding portion.

4. A cup holder according to claim 1, further comprising a frame for supporting the container,
wherein the container is formed of a material with friction coefficient higher than that of a frame material.

5. A cup holder according to claim 4, wherein the urging device is a leaf spring attached at one end to the frame.

6. A cup holder according to claim 5, wherein the frame includes an upper portion, a plurality of leg portions extending from the upper portion and situated outside the sidewall, and a bottom fixed to the leg portions and supporting the bottom portion of the container.

7. A cup holder according to claim 1, wherein a step portion is formed in the sidewall at a boundary of the flexible protruding portion thinner in thickness than the other portion.

* * * * *